United States Patent [19]

Walrath et al.

[11] Patent Number: 5,050,087
[45] Date of Patent: Sep. 17, 1991

[54] SYSTEM AND METHOD FOR PROVIDING ACCURATE ATTITUDE MEASUREMENTS AT REMOTE LOCATIONS WITHIN AN AIRCRAFT

[75] Inventors: Craig D. Walrath, Catonsville; Kristie L. Drude, Pasadena; Steven T. Nyman, Hanover, all of Md.

[73] Assignee: Westinghouse Electric Corp., Pittsburgh, Pa.

[21] Appl. No.: 442,601

[22] Filed: Nov. 29, 1989

[51] Int. Cl.$^5$ .............................................. G06F 15/50
[52] U.S. Cl. ................................... 364/434; 364/453; 244/17.11
[58] Field of Search ............... 364/453, 454, 433, 444, 364/434; 244/3.15, 3.21, 17.13, 17.11, 195, 194

[56] References Cited

U.S. PATENT DOCUMENTS

| | | | |
|---|---|---|---|
| 3,790,766 | 2/1974 | Brown | 364/453 |
| 3,984,072 | 10/1976 | von Pragenau et al. | 364/434 |
| 4,212,443 | 7/1980 | Duncan et al. | 364/453 |
| 4,831,544 | 5/1989 | Hojo et al. | 364/453 |

Primary Examiner—Thomas G. Black
Attorney, Agent, or Firm—John K. Williamson

[57] ABSTRACT

An improved method and system for providing accurate attitude measurements at a location in an vehicle remote from its inertial navigation system is disclosed. A relatively low cost, lightweight attitude reference sensor is mounted in the location where accurate attitude measurements are desired. The INS and the attitude reference sensor each include gyros and accelerometers for determining attitude about and translations along pitch, yaw and roll axes. A microprocessor periodically estimates steady-state vehicle flexure between the INS and the attitude reference sensor. Gyro measurements from the attitude reference unit are directly integrated to determine the attitude of the attitude reference sensor. This output is slaved over the long term to the sum of the INS attitude and the flexure estimate to compensate continuously for drift and other errors associated with the outputs of the low cost attitude reference sensor. Long-term accuracy is assured by this slaving while short-term accuracy is assured by direct gyro integration.

33 Claims, 5 Drawing Sheets

SYSTEM AND METHOD FOR PROVIDING ACCURATE ATTITUDE MEASUREMENTS AT REMOTE LOCATIONS WITHIN AN AIRCRAFT

BACKGROUND OF THE INVENTION

Modern combat aircraft are provided with a sophisticated Inertial Navigation System (INS) which determines the aircraft's attitude within a geographical coordinate system. These aircraft may also be provided with various types of sensing systems (known generally as avionics) which are often mounted at locations remote from the INS. One important class of these avionic systems are target locating systems. These systems locate hostile targets and calculate a vector from the avionic mounting location to the target. A weapons control system then uses the information from the target locating avionics and aircraft attitude information from the INS to aim and fire aircraft-mounted weapons at the target. These precision target locators, aircraft attitude sensors, and weapons guidance systems work together to create extremely accurate weapons delivery systems.

Unfortunately, the accuracy achieved by these guidance systems can be significantly impaired as a result of mechanical flexures induced in the frame of the aircraft during flight. Such flexure may come about, for example, by the application of different aerodynamic loads on various surfaces of the aircraft during flight, or different weight distributions within the aircraft as fuel is exhausted, etc. Because this flexure in the frame of the aircraft distorts the relative positions of the INS and the remotely-located target identification avionics, it can cause errors in weapons aiming. As the precision of the sensing and guidance systems have been improved, they have become so accurate that normal airframe flexure, even though it may produce only a thousandth of a radian of error in weapon-to-target vector calculations, is a primary limiting factor in overall system accuracy. This problem has in the past been overcome either by mounting all avionics in close proximity to the INS, or by providing the avionics with a dedicated attitude sensor of INS quality. These solutions have not been entirely satisfactory. It is not always practical, given weight distribution, space allocation, and avionics performance considerations, to mount avionics next to the INS. The provision of a second INS at the avionics location is prohibitively expensive and cumbersome, as an INS quality attitude sensor costs upwards of $300,000 and weighs about 50 pounds. While the use of a low-cost attitude sensor at the avionics location has been considered as a possible solution, the long term drift errors and other inaccuracies associated with the outputs of such low cost units has thus far prevented their use in this context.

Therefore, there is a need for a cost-effective system which accurately and reliably compensates for airframe flexure between the INS and avionics equipment.

OBJECTS OF THE INVENTION

Accordingly, it is a general object of the present invention to provide a novel and improved system and method for providing accurate attitude measurements at a location in a vehicle remote from its inertial navigation system.

It is another object of the present invention to provide a novel and improved system and method for accurately determining attitude at a location in a vehicle remote from its inertial navigation system (INS) by providing a second, low-cost attitude sensor at the remote location and by periodically calculating the flexure angle between the INS and the second attitude sensor and then slaving the output of the second attitude sensor to the sum of the INS output and the flexure angle to compensate for output error of the second sensor.

It is a further object of the present invention to provide a novel and improved system and method for accurately determining attitude at a location in a vehicle remote from its INS by using a second sensor at the remote location, with the INS and the second sensor both having gyroscopes and accelerometers, and to determine the remote attitude by combining the gyroscope and accelerometer data to take advantage of the unique properties of each and thus maximize the accuracy of the resulting remote attitude measurement.

Yet another object of the present invention is to provide a novel and improved system and method for accurately determining flexure between two points in a vehicle by using attitude data from a first, highquality sensor and a second, low-cost sensor, each located at one of the two points.

A further object of the present invention is to provide a novel and improved system and method for accurately determining vehicle attitude at a second attitude sensor location remote from an INS by sampling the outputs of the INS and the second attitude sensor at intervals and using the resulting data series to compute estimates of flexure between the INS and the remote location.

It is also an object of the present invention to provide a novel and improved system and method for accurately determining vehicle attitude at a second attitude sensor location remote from an INS by filtering the data outputs of the INS and the second sensor to remove vibration and steady-state error components of the data outputs prior to computing the attitude at the second sensor location.

It is another object of the present invention to provide a novel and improved system and method for accurately determining vehicle attitude at an attitude sensor location by using data from that sensor and another attitude sensor wherein the system and method compensates for differences in angular accelerations at the two sensor locations.

Other objects of the present invention will be apparent to those skilled in the art upon examination of the specification and drawings herein in conjunction with the claims.

SUMMARY OF THE INVENTION

These objects and others are achieved by providing a system and method for providing accurate attitude measurements at a location in an aircraft remote from its inertial navigation system that overcomes or least ameliorates the problems associated with the prior art. The system of the invention comprises a relatively low cost and light weight attitude reference sensor that is mounted in the location of the aircraft or other vehicle where accurate attitude measurements are desired. Like the INS, the low-cost attitude reference sensor includes gyros and accelerometers for determining attitude along pitch, yaw and roll axes. The system further comprises a microprocessor means for periodically computing any flexure angle which may be present between the INS and the attitude reference sensor as a result of vehicle flexure, and for slaving the output of the attitude reference sensor to the output of the sum of the INS and the flexure angle in order to reduce the long term drift error associated with the attitude output of the gyros of the low cost attitude reference sensor.

In the method of the invention, the slaving frequency of the output of the attitude reference sensor is set much lower than the frequency of the integration of the output of the gyros of the attitude reference sensor so that the system will have the agility to follow dynamic attitude fluctuations. The pitch and roll components of the flexure angle are computed by combining the information from the accelerometers and gyros of both the INS and the attitude reference sensor to advantageously eliminate the offset errors associated with the use of accelerometers to measure these angle components, but which preserves the rapid response of the accelerometers. The yaw component of the flexure angle is computed only from the informational input of the gyros of both sensors.

Before the roll, pitch and yaw components of the flexure angle are computed, the data from both the INS and attitude reference sensor are filtered so that rigid body motion dominates the resulting stream of information. Next, after appropriate alignment rotations have been made to bring the information received from the two sensors into a parallel frame of reference, the output information from both the accelerometers and gyros of each are sampled at 0.5 second intervals until twelve output data sets are obtained. Minimum mean square error estimates are then computed from the resulting data sets at 0.5 second intervals. The resulting estimates for the roll, pitch and Yaw components of the flexure angle are then filtered through noise filters to eliminate short term variations in the flexure angle.

The system and method provides a means for obtaining accurate attitude measurements at a remote location in an aircraft that flexes at an angle with respect to the INS mounted within the aircraft by means of a relatively inexpensive and light weight attitude reference sensor.

DETAILED DESCRIPTION OF A PREFERRED EMBODIMENT

Figure 1:
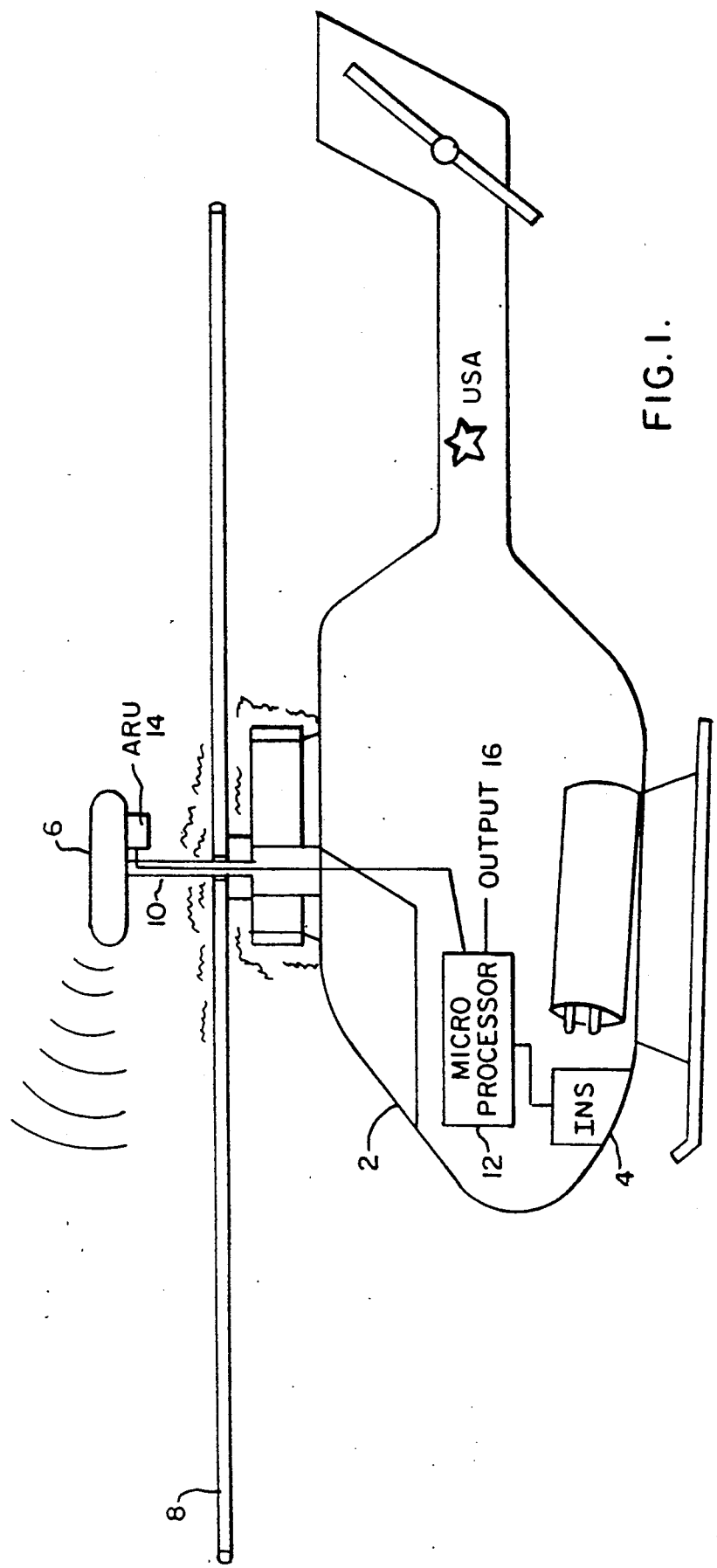
FIG. 1 is a diagram showing a typical location and connection of the ARU, the INS, and the attitude processor which implements the system and method of the present invention.

Referring first to FIG. 1, an aircraft 2 has a conventional inertial navigation system (INS) 4 which contains internal gyroscopes and accelerometers and provides directional attitude information to the pilot and to other systems of aircraft 2. Typically, the gyroscopes and accelerometers of INS 4 will be deployed to measure rotations about and accelerations along three mutually perpendicular and intersecting axes: pitch, yaw, and roll. The roll axis is the central longitudinal axis of the aircraft 2, the pitch axis is the central transverse axis of the aircraft 2, and the yaw axis is the central vertical axis of the aircraft 2.

The aircraft 2 is shown as a military helicopter, although the present invention is not limited in application to aircraft or to particular types of aircraft. The aircraft 2 is further shown with a radar targeting sensor 6 which is mounted on a fixed mast 10 above the rotor 8 although the present invention is not limited to use with such a sensor in such a location. The rotor 8 may be powered by a turbine 9. The targeting sensor 6 senses target objects in the air or on the ground and provides distance and direction information for these targets to weapons control systems (not shown) on the aircraft 2. Typically, the weapons control systems will use the distance and direction information provided by targeting sensor 6 and aircraft attitude information provided by INS 4 to aim weapons at the targets. However, when the targeting sensor 6 is mounted in the manner shown in FIG. 1, it is subjected to significant vibration from the turbine 9 and rotor 8. In addition, the entire structure of the aircraft (and particularly the mast 10) will flex during combat maneuvers. The target location is determined relative to targeting sensor 6, while the weapons are aimed relative to INS 4. Therefore, flexure between the INS 4 and the targeting sensor 6 will cause the calculated vector between the weapons and the target to differ from the actual weapon-target vector. Because the targeting sensor 6 and the weapons control systems operate with great precision when calculating vectors to the target, even slight flexure can cause significant weapons aiming errors. The aircraft structural flexure has both static and dynamic components.

The system of the present invention comprises a microprocessor 12 and an attitude reference unit (ARU) 14 which work together to compensate for this flexure in a manner which will be explained later in more detail. The microprocessor 12 may be mounted in any location on aircraft 2, while ARU 14 is mounted on or near targeting sensor 6. The INS 4 and the ARU 14 are connected to provide data inputs to microprocessor 12, and the microprocessor 12 has an output 16 which is the absolute attitude in geographical coordinates of the ARU 14. The output 16 may be used for any desired purpose but will ordinarily be provided to the weapons control system. Microprocessor 12 may preferably be constructed of conventional components including a microprocessor chip such as an INTEL 8086, RAM and ROM memory for storing programs and runtime data, analog-to-digital converters, and input/output ports. In the preferred embodiment, the microprocessor 12 is also provided with a high-speed hardware multiplier. The microprocessor 12 will be provided with operating instructions preferably prepared according to the Software Description Appendix to this specification.

The ARU 14 may be any appropriate instrument that contains gyroscopes and accelerometers and produces signals therefrom. For example, the ARU 14 may be an LP-80 Strapdown IMU manufactured by Litton Industries of Woodland Hills, Calif. The ARU 14 will be much smaller, lighter, and less expensive than the INS 4. Generally, the ARU 14 will produce signals similar in nature to those produced by INS 4, but the cost and weight advantages of the ARU 14 result in design compromises that make it much less accurate than the INS 4. Specifically, the gyroscopes of ARU 14 will be subject to significant "drift," or error which increases steadily over time. The accelerometers of ARU 14 are subject to significant bias errors. Therefore, while the ARU 14 is relatively lighter, smaller, and less expensive than the INS 4, the ARU 14 could not be used by itself to accurately indicate the geographic coordinate attitude of its mounting location. The output of ARU 14 must be used in conjunction with the output of INS 4 to obtain the correct absolute attitude at the mounting surface of ARU 14.

In operation, microprocessor 12 provides a hardware interrupt every 10 msec. At each interrupt, the motion sensors of INS 4 and ARU 14 are sampled and the attitude algorithms used by the system operate on the new motion data.

The algorithms used are designed to account for both static and dynamic flexure between the locations of INS 4 and ARU 14. In addition, the algorithms are designed to compensate for instrument biases and errors in the ARU 14. Generally, the static (or near-static) ARU attitudes are calculated by functionally "summing" INS attitudes and an optimum Minimum Mean Square Error (MMSE) estimate of flexure angles between the INS 4 and ARU 14. The gyroscope rate inputs Wx, Wy, and Wz provide information on dynamic deviation from the average. The static or average attitude is then functionally "summed" with the dynamic gyro rate information to determine the flexure between INS 4 and ARU 14.

Figure 2:
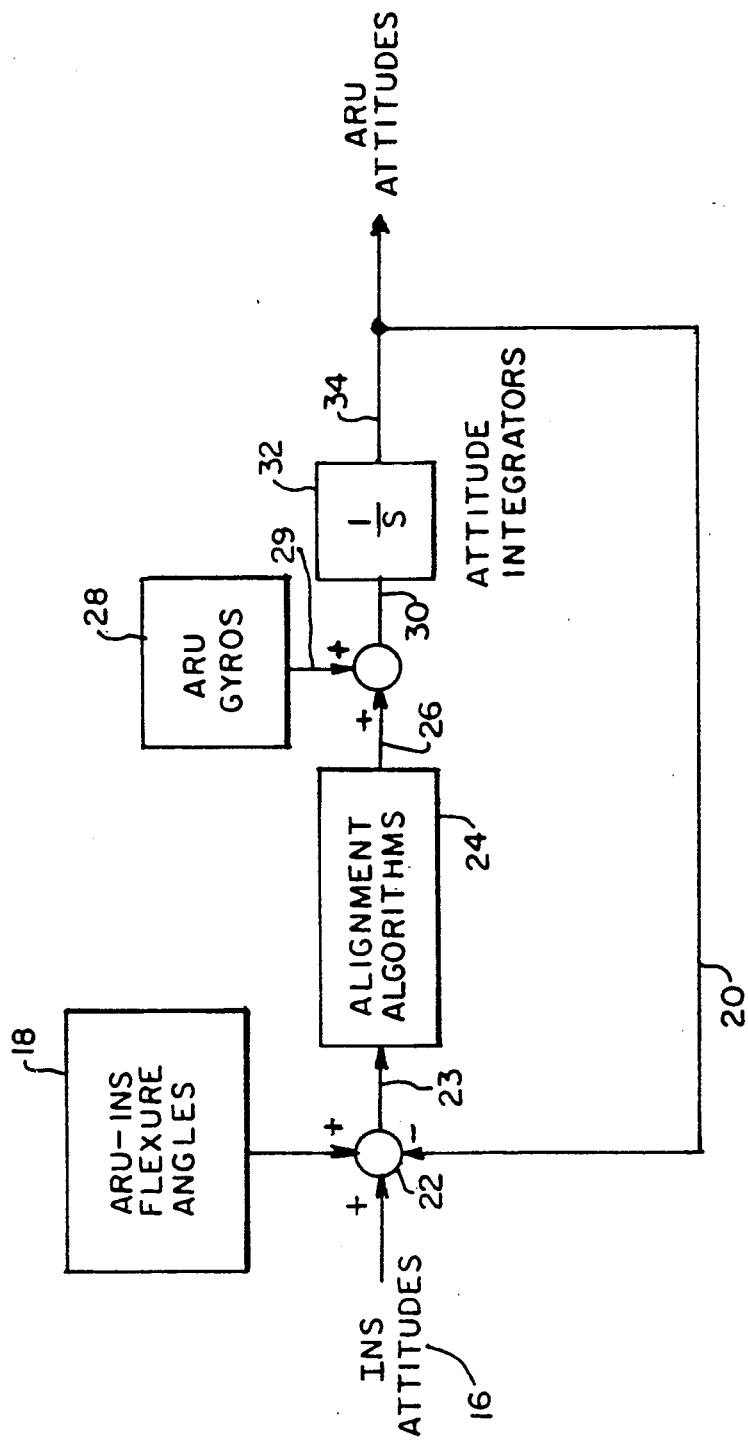
FIG. 2 is a block diagram illustrating generally the operation of the system and method of the present invention.

FIG. 2 shows generally the method used in the present system to determine absolute attitudes at ARU 14 from the outputs of the INS 4 and ARU 14. In general, the INS attitudes 16 measured at INS 4 (in terms of the aircraft's pitch, yaw and roll axes) form the starting point for calculating the attitude of the ARU 14 mounting surface. The INS attitudes 16 are an input to a summer 22.

The ARU-INS flexure angles 18 are calculated by the method and device of the present invention in a manner that will be described in the text accompanying FIGS. 4 and 5. Briefly, the ARU-INS flexure angles 18 are an estimate of the steady-state flexure angle between the INS 4 and ARU 14. These ARU-INS flexure angles 18 are another input of the summer 22.

The currently measured ARU attitudes 34 are fed back to form a final input 20 of the summer 22. The summer 22 operates on the ARU-INS flexure angles 18, the INS attitudes 16, and the ARU attitudes 20 to produce a residual output 23 which is the residual error or difference between the current estimated ARU and measured INS attitudes.

Alignment algorithms 24 process the residual output 23 to produce an attitude correction rate 26 The alignment algorithms 24 thus compensate for the effects of ARU gyroscope drift. The dynamic ARU gyro data 28 is transmitted at 29 and added to the correction rate 26 at summer 30 to produce a dynamic indication of angular rate on the pitch, yaw, and roll axes. Integrator 32 integrates the output of summer 30 to produce ARU attitudes 34 which will be the geographical attitudes of the mounting surface of ARU 14.

Figure 3:
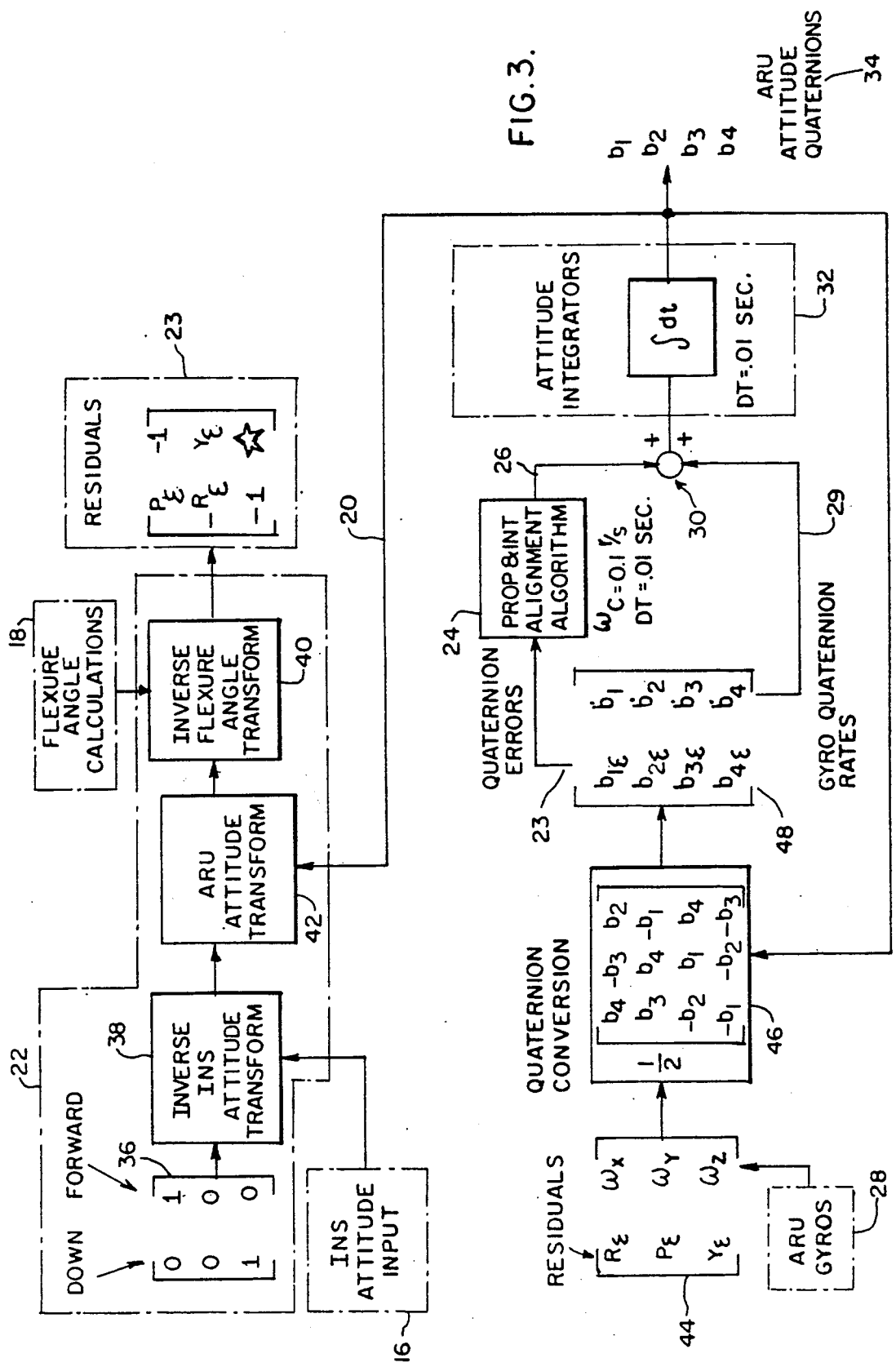
FIG. 3 is a detailed block diagram showing the operation of the system and method of the present invention.

FIG. 3 shows in detail the matrix algorithms which are preferably used in the processing steps of FIG. 2.

While the summation operation of summer 22 is shown as a single step in FIG. 2, actual implementation of summer 22 requires several steps, each operating on sets of three coordinate values. As shown in FIG. 3, the summer 22 comprises a unit vector matrix input 36, an inverse INS attitude transform 38, an ARU attitude transform 42, and inverse flexure angle transform 40.

The unit vector matrix 36 is formed from body-referenced unit vectors representing "down" and "forward". These unit vectors are transformed by the Inverse INS attitude transformation 38 which uses the INS attitude input 16 to determine current aircraft body orientation and then restates the unit vectors from matrix 36 in terms of their geographical components. Next, ARU attitude transform 42 uses the output of INS attitude transformation 38 to restate "down" and "forward" back in body coordinates. This output of ARU attitude transformation 42 is then subjected to inverse flexure angle transform 40 which uses the steady state estimate of ARU-INS flexure angles 18 to determine the steady-state difference in orientation between INS coordinates and ARU coordinates. The flexure angle transformation 40 then restates the "down" and forward body coordinate unit vectors of the INS 4 in terms of their components in the current steady-state estimated ARU coordinate system. The result is a residual matrix 23. The residual matrix 23 Will exactly reproduce the unit vector matrix 36 if the ARU attitudes 34 agree precisely with the INS attitudes 16 modified by the flexure transform 40. For non-exact alignment, the residual matrix 23 will differ from the unit vector matrix 36 by error terms which result from ARU gyroscope drift. In particular, the error terms of interest in residual matrix 23 are designated Pe, Re, and Ye for pitch, roll, and yaw error respectively. Because of the feedback design of the system, the residuals tend to drive the ARU attitudes 34 into alignment with the INS attitudes 16 modified by the estimate of flexure, so that the residuals Pe, Re, and Ye tend toward zero.

In the preferred embodiment, the method of quaternions is used for attitude integration. Therefore, the residual output 23 (Re, Pe, and Ye) and the ARU gyro data 28 (consisting of angular accelerations Wx, Wy, and Wz) must both be converted to quaternions. This conversion is accomplished by forming a hybrid matrix 44 and multiplying the hybrid matrix 44 by quaternion conversion matrix 46 to obtain quaternion output matrix 48. For reference, the elements b1, b2, b3, and b4 of quaternion conversion matrix 46 are defined by:

$$b1 = \cos(P/2)\cos(Y/2)\sin(R/2) - \sin(P/2)\sin(Y/2)\cos(R/2)$$

$$b2 = \cos(p/2)\sin(Y/2)\sin(R/2) + \sin(P/2)\cos(Y/2)\cos(R/2)$$

$$b3 = \cos(P/2)\sin(Y/2)\cos(R/2) - \sin(P/2)\cos(Y/2)\sin(R/2)$$

$$b4 = \cos(P/2)\cos(Y/2)\cos(R/2) + \sin(P/2)\sin(Y/2)\sin(R/2)$$

Where P, Y, and R are the pitch, yaw, and roll angles respectively.

The elements of the first column of quaternion output matrix 48 will be the quaternion errors 23 (equivalent to Re, Pe, and Ye). The elements of the second column of matrix 48 will be the quaternion rates 29 (equivalent to the outputs of ARU gyros Wx, Wy, and Wz).

The quaternion errors 23 are operated on by the alignment algorithm 24, to produce correction rate 26. Specifically, $$b_nc = (w_c)b_{ne} + \tfrac{1}{2}(w_c^2) \int b_{ne} dt$$

which is a proportional+integral algorithm of bandwidth $W_c$ radians/second where n=1 to 4 and $b_nc$ are the correction rate outputs 26. The integral feature of the alignment algorithms tends to eliminate drift errors from the gyro data.

The correction rate 26 and the ARU gyro data 29, which are both in quaternion form, are added together by summer 30 and integrated by the attitude integrator 32. The attitude integrator 32 preferably integrates at a rate of DT=0.01 second, corresponding to the selected hardware interrupt frequency. The attitude integrator 32 produces as an output ARU attitudes 34, these attitudes also being in quaternion form.

The method of estimating flexure angles between ARU 14 and INS 4 will now be described in detail. Generally, flexure angle estimates are computed by comparing the three-dimensional measurements of the same quantity provided by sensors in the INS 4 and ARU 14. These quantities are angular rate as measured by gyroscopes and specific force as measured by accelerometers. Using information from both gyroscopes and accelerometers allows elimination of deficiencies associated with using either gyroscope data or accelerometer data exclusively. The most significant deficiency is associated with accelerometer measurements. First, these measurements contain prohibitively minimal information in the yaw dimension. For pilot comfort, aircraft bank when turning and thus fly with the net specific force vector continuously "down" through the pilot's seat, or along the yaw axis. Thus, the component of accelerometer measurements along the yaw axis will be difficult to determine. Second, the accelerometers provide pitch and roll information that, while relatively less noisy than gyroscope information, is tainted by large instrument bias errors. The coordinated addition of gyro measurements removes these deficiencies and yet allows use of the high-quality accelerometer-based pitch and roll information.

Figure 4:
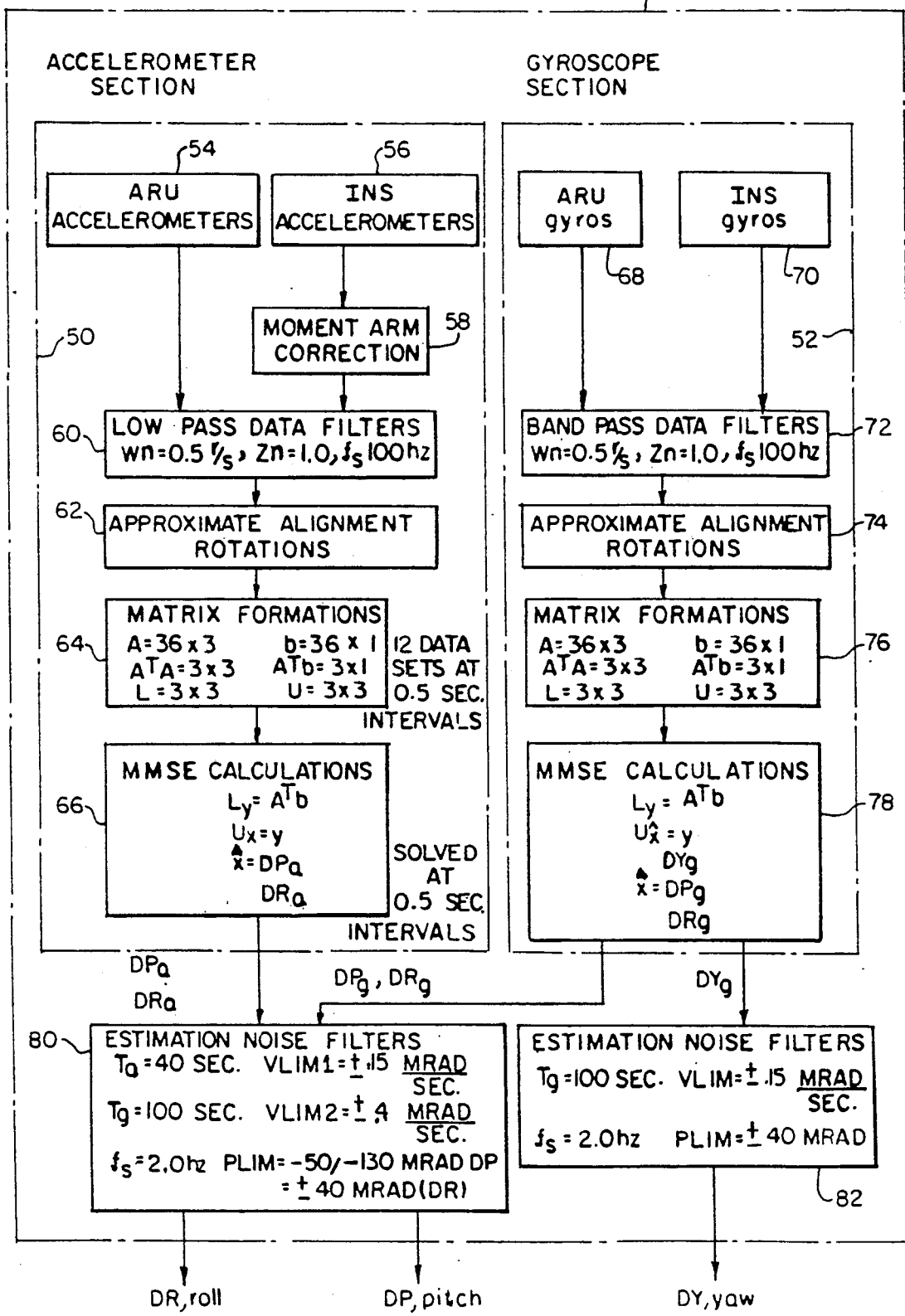
FIG. 4 is a flowchart showing the calculation of ARU-INS flexure angles.
Figure 5:
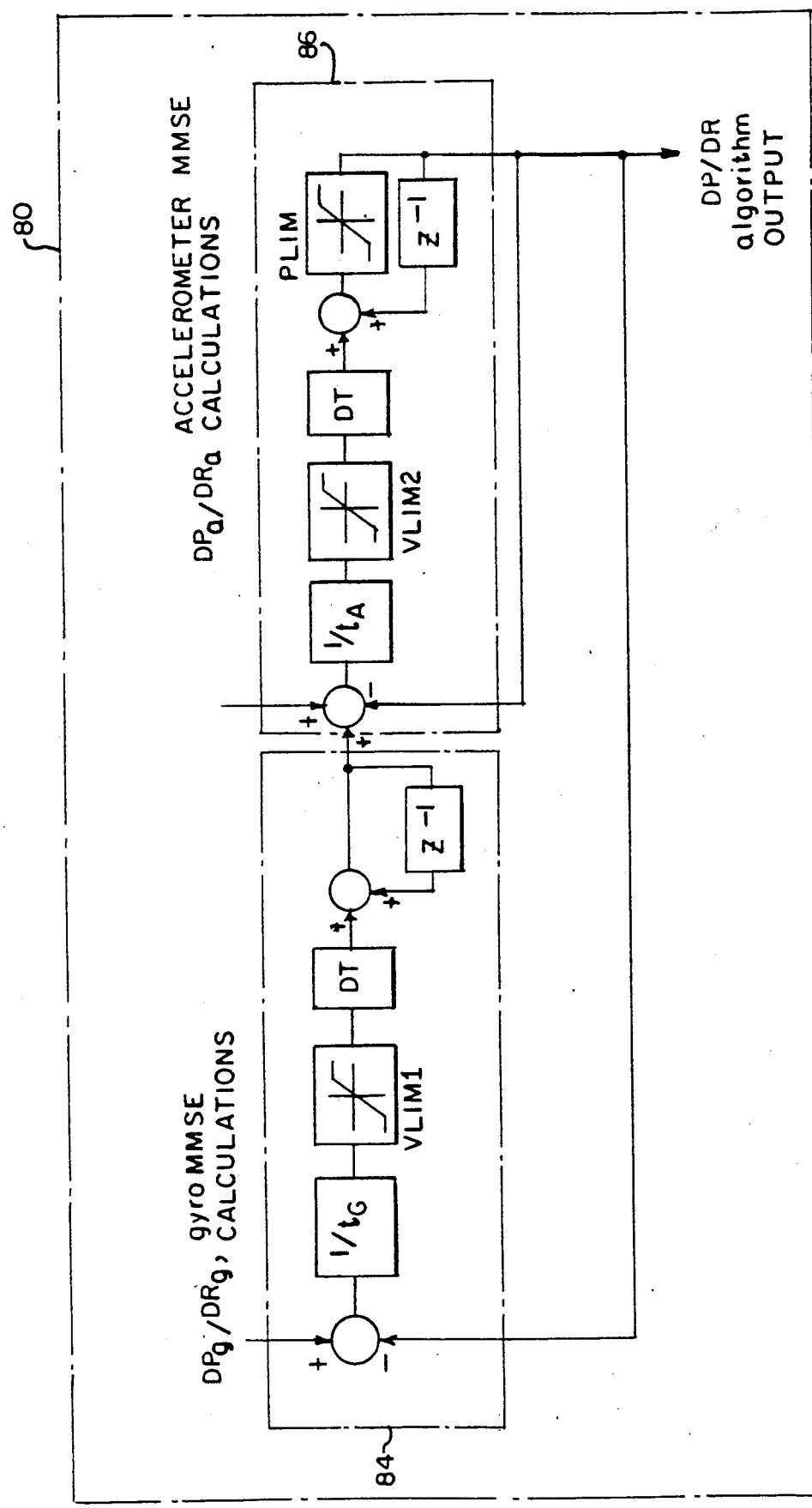
FIG. 5 is a block diagram of the estimation noise filters used in the ARU-INS flexure angle calculation.

FIG. 4 is a flowchart showing the steps used in calculating an estimate of the steady-state flexure angle between the INS 4 and the ARU 14. As shown in FIG. 4, an accelerometer section 50 operates on data from ARU and INS accelerometers to produce estimates of pitch and roll flexure, DPa and DRa. A gyroscope section operates on ARU and INS gyroscope data to produce estimates of pitch, roll, and yaw flexure DPg, DRg, and DYg. These estimates DPa, DRa, DPg, DRg, and DYg are then combined and digitally filtered to produce estimates of pitch, roll, and yaw flexure DP, DR, and DY. These estimates form the output of ARU-INS flexure angle section 18.

In accelerometer section 50, INS accelerometer data 56 is subjected to a moment arm correction 58. The moment arm correction 58 is necessary because the dynamic angular acceleration of aircraft 2 and the physical distance between the ARU 14 and INS 4 act together to produce differing acceleration measurements at the two locations. These effects are removed by adding a correction factor matrix equal to $(w \times r) + (w \times w \times r)$ to the INS accelerometer data 56, where w is the vehicle angular acceleration vector, w is the vehicle angular acceleration rate vector, and r is the physical displacement vector between the INS 4 and the ARU 14.

The INS accelerometer data 56 and the ARU accelerometer data 54 are then filtered separately and successively by low pass data filter 60 which is a conventional digital data filter. This filter removes the high-frequency components of the accelerometer data which are induced by aircraft vibrations. If not removed, the vibrations would tend to dominate the desired flexure measurements. In the embodiment shown, the low pass data filter 60 has a natural frequency $Wn=0.5$ radians/second, damping parameter $Zn=1.0$, and iteration rate $Fs=100$ hertz.

The data filtered by low pass filter 60 is then transformed by an approximate alignment rotation 62 which compensates for fixed angular differences between the coordinate systems of INS 4 and ARU 14. The fixed transformation used in alignment rotation 62 will depend on the relative mounting angles of INS 4 and ARU 14 in the aircraft. The alignment rotation 62 is selected so that after the alignment rotation, the INS data is presented in terms of ARU coordinates.

In the matrix formation step 64, the matrices required for calculating steady-state flexure are formed. As shown in the flowchart, the matrices required are A, b, $A^TA$, $A^Tb$, L, and U. The composition of these matrices will now be explained in detail. The flexure matrix x will be calculated from the equation $A * x = b$ where the dimensions of A are $36 \times 3$, the dimensions of b are $36 \times 1$, and the dimensions of x are $3 \times 1$, with A, b, and x having the following composition:

$$A = \begin{bmatrix} -Sy_1 & Sz_1 & 0 \\ Sx_1 & 0 & -Sz_1 \\ 0 & -Sx_1 & Sy_1 \\ \cdot & \cdot & \cdot \\ \cdot & \cdot & \cdot \\ \cdot & \cdot & \cdot \\ -Sy_{12} & Sz_{12} & 0 \\ Sx_{12} & 0 & -Sz_{12} \\ 0 & -Sx_{12} & Sy_{12} \end{bmatrix}$$

$$b = \begin{bmatrix} Mx_1 - Sx_1 \\ My_1 - Sy_1 \\ Mz_1 - Sz_1 \\ \cdot \\ \cdot \\ Mx_{12} - Sx_{12} \\ My_{12} - Sy_{12} \\ Mz_{12} - Sz_{12} \end{bmatrix}$$

$$x = \begin{bmatrix} Y \\ P \\ R \end{bmatrix}$$

where Sx, Sy, and Sz are the ARU sensor readings, Mx, My, and Mz are the INS sensor readings, and Y, P, and R are estimates of the static flexure angles between the INS and ARU. Using a single set of sensor readings, which would result in a $3 \times 3$ matrix A, would not produce 3 independent equations within matrix A, so that the equation $A * x = b$ could not be solved. Therefore, the matrices A and b are made up from 12 sets of ARU and INS sensor readings which are identified in the matrices by subscripts 1-12. These sets of ARU and INS sensor readings are preferably taken at 0.5 second intervals, and the most recent 12 sets of sensor readings are used. It has been empirically determined that using 12 sets of sensor readings taken at 0.5 second intervals adds enough additional information to the matrix A to ensure a solution of the equation. At the same time, using 12 readings will not make output so heavily dependent on past data that the system cannot respond with sufficient speed to changing conditions.

The optimum MMSE solution of the equation A * x=b is: $x=(A^TA)^{-1}A^Tb$. The most computationally efficient method of performing these calculations is by LU decomposition of the $A^TA$ matrix where $LU=A^TA$ and:

$$L = \begin{bmatrix} 1 & 0 & 0 \\ L21 & 1 & 0 \\ L31 & L32 & 0 \end{bmatrix}$$

$$U = \begin{bmatrix} U11 & U12 & U13 \\ 0 & U22 & U23 \\ 0 & 0 & U33 \end{bmatrix}$$

Thus, in matrix formation operation 64, the matrices A and b are formed from the sensor measurements, after which $A^TA$ and $A^Tb$ are calculated. Then, the simple identities between the elements of $A^TA$, L, and U are used to find the elements of the L and U matrices.

In MMSE calculation section 66, a solution is found for the vector x using the matrices formulated in formulation section 64 in the following manner: First, the vector equation $Ly=A^Tb$ is solved for y by forward substitution. Then, the vector equation $Ux=y$ is solved by backward substitution for x. As explained previously, the accelerometers cannot be used to accurately calculate yaw flexure, so only the accelerometer-measured pitch flexure DPa and roll flexure DRa are provided as outputs of accelerometer section 50.

In actual practice, the lack of yaw data in the accelerometer measurements allows significant simplification of the calculations just described for matrix formation step 64 and MMSE calculation section 66. If the yaw flexure angle is assumed to be zero, the mathematical operations of steps 64 and 66 can be reduced to:

$$DPa = \frac{\sum_{n=1}^{12} Sz_n(Mx_n - Sx_n)}{\sum_{n=1}^{12} Sz_n * Sz_n}$$

$$DRa = \frac{-\sum_{n=1}^{12} Sz_n(My_n - Sy_n)}{\sum_{n=1}^{12} Sz_n * Sz_n}$$

In the gyroscope section 52, the ARU gyro information 68 and the INS gyro information 70 are provided to a digital bandpass data filter 72 with characteristics Wn=0.5 radians/second, Zn=1.0, and Fs=100 hertz. Like the low pass data filter 60, bandpass data filter 72 removes components of the gyroscope data that are produced by aircraft vibration. The bandpass data filter 72 also compensates for gyroscope drift error by removing the low frequency components which contain the drift error. The output of the bandpass data filter 72 is then provided to alignment rotation section 74, matrix formation 76, and MMSE calculation section 78 which operate in a substantially similar manner to the corresponding sections 62, 64, and 66 of accelerometer section 50. The output of gyroscope section 52 is a matrix x with estimated flexure components DPg, DRg, and DYg. Unlike the accelerometer section 50, which did not produce a usable yaw flexure estimate, all three components of the MMSE solution for matrix x will be used as outputs of gyroscope section 52. Because the gyros do include information on yaw flexure (unlike the accelerometers), the calculations in matrix formation step 76 and MMSe calculation section 78 cannot be simplified as described with reference to accelerometer section 50.

As explained previously, gyro drift errors can be eliminated at the pre-calculation stage by the band pass data filter 72. Although this filtering removes the drift errors, it causes the filtered gyro data to respond more slowly to changes in flexure. Accelerometers, on the other hand, are subject to bias or DC offset errors. These errors cannot be removed from the accelerometer-based flexure calculations because the bias error is fixed relative to the body like the net specific force and is thus inseparable from the net acceleration measurement vector (always downward through the pilot's seat).

However, when the accelerometer data is combined with the gyro flexure data, the benefits of each can be extracted, at least for pitch and roll flexures. This is accomplished by selecting pitch and roll filtering algorithms with a second order configuration which accepts both the accelerometer and gyro MMSE inputs. The estimation noise filter's transient response is controlled by the accelerometer inputs and will therefore be relatively more rapid, while its steadystate response is controlled by the gyro-based data and will therefore be free of offset errors.

As shown in FIG. 4, there are provided estimation noise filters 80 and 82 for filtering the outputs of accelerometer section 50 and gyroscope section 52 to produce MMSE steady-state flexure estimates. The estimation noise filters 80 and 82 are implemented digitally. The pitch and roll data is actually filtered separately in estimation noise filter 80 using slightly different parameters in the same general filtering algorithm. However, the estimation noise filter 80 is shown as a single block in the flowchart of FIG. 4 because it may be preferably implemented as a single software subroutine which is executed to operate consecutively on pitch and roll data.

The pitch and roll estimation noise filter 80 has as inputs the pitch or roll outputs DPa or DRa of accelerometer section 50 and the pitch or roll outputs DPg or DRg of gyroscope section 52, respectively. The outputs of estimation noise filter 80 are MMSE steadystate flexure estimates DR (roll) or DP (pitch). In general, estimation noise filter 80 will extract from the gyroscope-based MMSE flexure estimates DPg or DRg a steady-state flexure component. As explained previously, the gyroscope-based estimates are used to obtain the steady-state flexure component because drift errors can be eliminated from the gyroscope data, so that it provides an accurate steady-state flexure estimate. To the gyroscope-based steady-state component, the estimation noise filter 80 will add a dynamic component obtained accelerometer-based MMSE flexure estimates DPa or DRa. The accelerometer-based data will include bias error, so it cannot be used to accurately determine steady-state conditions. However, the accelerometer-based data contains less noise than the gyroscope-based data and responds more quickly to flexure changes. Therefore, the accelerometer-based data is valuable for determining a dynamic flexure component. Referring now to FIG. 5, a block diagram of estimation noise filter 80 is shown.

Estimation noise filter 80 comprises a steady-state section 84 and a dynamic section 86. Steady state section 84 has as positive inputs DPg or DRg, which are the outputs of gyroscope section 52 (shown in FIG. 4), and has as a negative input a feedback loop from the output of estimation noise filter 80, DP or DR. The steady state section 84 first scales the sum of the input data by a factor of 1/Tg, then limits the result within bounds VLIM1 and integrates it every DT seconds. The dynamic section 86 has as positive inputs DPa or DRa (the outputs of accelerometer section 50 as shown in FIG. 4) and the integrated output of the steady state section 84. The output of estimation noise filter 80, DP or DR, forms a negative input of dynamic section 86. The sum of the inputs to dynamic section 86 is first scaled by a factor 1/Ta, then limited within bounds VLIM2, then integrated every DT seconds, with the internal value of the integral limited by bounds PLIM. The output of dynamic section 86 is the output of estimation noise filter 80, DP or DR.

In the preferred embodiment, the parameters used are: Tg=100 seconds; Ta=40 seconds; DT=0.5 seconds (to correspond to the 0.5 second data set collection interval); VLIM1=+0.00015 radians/second to −0.00015 radians/second; VLIM2+0.0004 radians/second to −0.0004 radians/second; and PLIM=−0.05 radians to −0.13 radians for pitch data filtering and +0.04 radians to −0.04 radians for roll data filtering.

The limiting functions VLIM1, VLIM2, and PLIM are used to limit the estimated flexure values passing through and generated by the system to values that are physically possible. If a clearly erroneous (very large) flexure measurement enters the system, the steady-state estimates Will reflect the erroneous measurement only to the extent allowed by the limiting functions. By placing bounds on the steady-state values, the limiting functions thus reduce the time required for the system to settle back to an accurate flexure estimation state after a perturbation.

Referring again to FIG. 4, an estimation noise filter 82 has as an input the yaw flexure estimate DYg, which is an output of gyroscope section 52. The output of estimation noise filter 82 is a yaw estimate DY which also forms an output of the ARU-INS flexure angle section 18. The estimation noise filter 82 preferably has a structure identical to the structure of estimation noise filter 80 (as shown in FIG. 5 and described in the accompanying text). However, the parameters used and the designations of the inputs and outputs for estimation noise filter 82 will differ from those of estimation noise filter 80. The input of the steady-state section of estimation noise filter 82, corresponding to steady-state section 84 of the estimation noise filter 80, will be DYg instead of DPg or DRg. Also, the input of the dynamic section of estimation noise filter 82, corresponding to dynamic section 86 of the estimation noise filter 80, will be zero rather than DPa or DRa, because accelerometer based estimates for yaw flexure are not accurate. The parameters used in estimation noise filter 82 will be: Tg=100 seconds, DT=0.5 seconds, Fs=2.0 hertz, VLIM1+0.00015 radians/second to −0.00015 radians/second, PLIM=+040 radians/second to −0.040 radians/second, VLIM2+0.0004 radians/second to −0.0004 radians/second, and Ta=40 seconds.

Thus, a novel and improved system and method for providing accurate attitude measurements at a location in an aircraft remote from its inertial navigation sensor has been disclosed. Those skilled in the art will recognize obvious modifications and adaptations to the embodiment disclosed which are within the spirit of the present invention. Therefore, the invention is not limited to the embodiment disclosed, but is intended to be limited only by the claims.

SOFTWARE DESCRIPTION APPENDIX

I. IMU Inputs

IMU angular rates and linear accelerations are computed from incremental inputs by

```
WXG=IAX/dT
WYG=IAY/dT
WZG=IAZ/dT
AXG=DVX/dT
AYG=DVY/dT
AZG=DVZ/dT
``` where

IA* = incremental angle measurements from IMU in radians
W*G = IMU angular rates in rad/sec
A*G = IMU linear accelerations in meters/sec/sec
DV* = incremental velocity measurement from IMU in meters/sec
dT = calculation time interval in seconds (nominally .01 seconds but continuously recomputed by dT=T-To to prevent "breathing" problems)

II. INS Inputs

Angular rates from the INS, in rad/sec, are WXS, WYS, WZS.

Angular accelerations from the INS, in rad/sec/sec, are WDX, WDY, WDZ.

Linear accelerations from the INS, in meters/sec/sec, are AXS, AYS, AZS.

Vehicle attitude angles, in radians, from the INS are Y, P, R.

III. IMU/INS Misalignment Computations

IIIa. Moment Arm Correction of INS Linear Accelerations

INS linear accelerations are moment-arm corrected
(ie, ASC = AS +(WDxR) + Wx(WxR) ) by:
```
    AXSC= AXS + WDY*RZ - WDZ*RY + WYS*WXS*RY + WXS*WZS*RZ
          - WZS*WZS*RX - WYS*WYS*RX
    AYSC= AYS + WDZ*RX - WDX*RZ + WYS*WZS*RZ + WXS*WYS*RX
          - WZS*WZS*RY - WXS*WXS*RY
    AZSC= AZS + WDX*RY - WDY*RX + WXS*WZS*RX + WYS*WZS*RY
          - WXS*WXS*RZ - WYS*WYS*RZ
```
where
- A*SC = corrected INS accelerations in meters/sec/sec
- A*S  = INS linear accelerations in meters/sec/sec
- WD*  = INS angular accelerations in rad/sec/sec
- W*S  = INS angular rates in rad/sec
- RX   = fwd position of IMU with respect to the INS in meters
- RY   = right position of IMU with respect to the INS in meters
- RZ   = down position of IMU with respect to the INS in meters

IIIb. Data Filtering of IMU and INS Rates and Accelerations

INS rates(W*S), corrected INS accelerations(A*SC), IMU rates (W*G), and INS accelerations(A*G) ( 12 variables in all) are all processed by the same iterative data filtering algorithm shown below with WXS used as an input example:
```
    X2D=WN*(WXS-2*ZN*X2-X3)
    X3D=WN*X2

X2=X2+dT*X2D
    X3=X3+dT*X3D
```
where
- WXS = example of appropriate input
- WN=0.5=natural frequency in rad/sec
- ZN=1.0=damping factor
- X2=bandpass output (initial value = 0.0)
- X3=lowpass output (initial value = 0.0)
- dT=calculation time interval in seconds (previously defined)

In the calculations which follow, the bandpass outputs (X2) of the rates and the lowpass outputs (X3) of the accelerations will be used.

IIIc. Prealignment of the IMU Measurements

The outputs of the IMU data filters are now rotated through a constant transformation to account for any "large", fixed misalignments which may exist between IMU and INS due to mounting constraints.
These calculations are performed on both rate and acceleration IMU data filter outputs using the bandpass output (X2) of the appropriate filter for the rates and the lowpass output (X3) of the appropriate filter for the accelerations. The calculations, performed every dT seconds (ie, at a nominal 100 hz rate), are $$\begin{vmatrix} AXGF \\ AYGF \\ AZGF \end{vmatrix} = \begin{vmatrix} M11 & M12 & M13 \\ M21 & M22 & M23 \\ M31 & M32 & M33 \end{vmatrix} * \begin{vmatrix} X3AXG \\ X3AYG \\ X3AZG \end{vmatrix}$$

$$\begin{vmatrix} WXGF \\ WYGF \\ WZGF \end{vmatrix} = \begin{vmatrix} M11 & M12 & M13 \\ M21 & M22 & M23 \\ M31 & M32 & M33 \end{vmatrix} * \begin{vmatrix} X2WXG \\ X2WYG \\ X2WZG \end{vmatrix}$$

where

```
X3AXG = the X3 output of the IMU x acceleration filter
X3AYG = the X3 output of the IMU Y acceleration filter
X3AZG = the X3 output of the IMU z acceleration filter
X2WXG = the X2 output of the IMU x rate filter
X2WYG = the X2 output of the IMU y rate filter
X2WZG = the X2 output of the IMU z rate filter
``` and

M** will be constants between -1 and 1 which will be
finalized during system integration tests but will
have the following values until that time:
M11=M22=M33=1.0
M12=M13=M21=M23=M31=M32=0.0

IIId. Minimum Mean Square Error (MMSE) Misalignment Angle Computations Based on Acceleration Measurements Lowpass filtered INS and prealigned IMU accelerations are sequentially accumulated at 0.5 sec intervals over a 6.0 sec period. The 12 latest data sets are used to form the following running summations:

$$SumD = \sum_{n=1}^{n=12} [ AZGFn * AZGFn ]$$

$$SumP = \sum_{n=1}^{n=12} [ AZGFn * (AXSFn - AXGFn) ]$$

$$SumR = \sum_{n=1}^{n=12} [ AZGFn * (AYSFn - AYGFn) ]$$

A*GFn = the prealigned lowpass data filter outputs (X3) for IM acceleration inputs in meters/sec/sec observed at the sec intervals A*SFn = the lowpass data filter outputs (X3) for INS acceleration inputs in meters/sec/sec observed at the 0.5 sec intervals The optimum (MMSE) estimates of angular pitch and roll misalignment of the IMU with respect to the INS based on acceleration measurements are calculated from these sums at 0.5 sec intervals by:

DPA= SumP/SumD
DRA= -SumR/SumD where

DPA = the MMSE pitch estimate in radians
DRA = the MMSE roll estimate in radians Unlike the misalignment estimates based on rate measurements, accelerometer measurements possess no useful estimates of yaw misalignment. This fact is an outgrowth of coordinated flight, bank-to-turn aircraft dynamics. The simplicity of the above calculations relative to the rate MMSE calculations which follow takes advantage of that fact by not solving for yaw. These calculations also produce pitch and roll estimates with greatly reduced randomness over a complete 3-dimensional solution and so are benificial on their performance improvement alone. For reference, the fundamental relationship to be solved reduces to:

$$\begin{vmatrix} AZGF & 0 \\ 0 & -AZGF \end{vmatrix} * \begin{vmatrix} DP \\ DR \end{vmatrix} = \begin{vmatrix} AXSF-AXGF \\ AYSF-AYGF \end{vmatrix}$$

instead of $$\begin{vmatrix} -AYGF & AZGF & 0 \\ AXGF & 0 & -AZGF \\ 0 & -AXGF & AYGF \end{vmatrix} * \begin{vmatrix} DY \\ DP \\ DR \end{vmatrix} = \begin{vmatrix} AXSF-AXGF \\ AYSF-AYGF \\ AZSF-AZGF \end{vmatrix}$$

IIIe. Minimum Mean Square Error (MMSE) Misalignment Angle Computations Based on Rate Measurements Bandpass filtered INS and prealigned IMU rates are sequentially accumulated at 0.5 sec intervals over a 6.0 sec period. The 12 latest data sets are used to form the matrix Aw (dimension 36x3)

$$Aw = \begin{vmatrix} -WYGF1 & WZGF1 & 0 \\ WXGF1 & 0 & -WZGF1 \\ 0 & -WXGF1 & WYGF1 \\ & \cdot & \\ & \cdot & \\ & \cdot & \\ -WYGF12 & WZGF12 & 0 \\ WXGF12 & 0 & -WZGF12 \\ 0 & -WXGF12 & WYGF12 \end{vmatrix}$$

and vector Bw (dimension 36x1)

$$Bw = \begin{vmatrix} WXSF1-WXGF1 \\ WYSF1-WYGF1 \\ WZSF1-WZGF1 \\ \cdot \\ \cdot \\ \cdot \\ WXSF12-WXGF12 \\ WYSF12-WYGF12 \\ WZSF12-WZGF12 \end{vmatrix}$$

where
- $W*GF*$ = the prealigned bandpass data filter outputs (X2) for IMU rate inputs in rad/sec observed at the 0.5 sec intervals
- $W*SF*$ = the bandpass data filter outputs (X2) for INS rate inputs in rad/sec observed at the 0.5 sec intervals Aw and Bw are then used to compute a new matrix ATAw (dimension 3x3) and a new vector ATBw (dimension 3x1) by premultipling each with the transpose of Aw (dimension 3x36):

$$ATAw = \begin{vmatrix} -WYGF1 & WXGF1 & 0 & -WYGF12 & WXGF12 & 0 \\ WZGF1 & 0 & -WXGF1 & \ldots & WZGF12 & 0 & -WXGF12 \\ 0 & -WZGF1 & WYGF1 & 0 & -WZGF12 & WYGF12 \end{vmatrix} * \begin{vmatrix} -WYGF1 & WZGF1 & 0 \\ WXGF1 & 0 & -WZGF1 \\ 0 & -WXGF1 & WYGF1 \\ & \cdot & \\ & \cdot & \\ -WYGF12 & WZGF12 & 0 \\ WXGF12 & 0 & -WZGF12 \\ 0 & -WXGF12 & WYGF12 \end{vmatrix}$$

$$ATBw = \begin{vmatrix} -WYGF1 & WXGF1 & 0 & -WYGF12 & WXGF12 & 0 \\ WZGF1 & 0 & -WXGF1 & \ldots & WZGF12 & 0 & -WXGF12 \\ 0 & -WZGF1 & WYGF1 & 0 & -WZGF12 & WYGF12 \end{vmatrix} * \begin{vmatrix} WXSF1-WXGF1 \\ WYSF1-WYGF1 \\ WZSF1-WZGF1 \\ \cdot \\ \cdot \\ WXSF12-WXGF12 \\ WYSF12-WYGF12 \\ WZSF12-WZGF12 \end{vmatrix}$$

The ATAw matrix is now "factored" into two matrices, Lw and Uw (each with dimension 3x3) such that Lw*Uw = ATAw where $$Lw = \begin{vmatrix} 1 & 0 & 0 \\ Lw21 & 1 & 0 \\ Lw31 & Lw32 & 1 \end{vmatrix} = \text{a lower diagonal matrix}$$

$$Uw = \begin{vmatrix} Uw11 & Uw12 & Uw13 \\ 0 & Uw22 & Uw23 \\ 0 & 0 & Uw33 \end{vmatrix} = \text{an upper diagonal matrix}$$

by the calculations

```
        Uw11=ATAw11
        Uw12=ATAw12
        Uw13=ATAw13

Lw21=ATAw21/Uw11
        Lw31=ATAw31/Uw11

Uw22=ATAw22-Lw21*Uw12
        Uw23=ATAw23-Lw21*Uw13

Lw32=(ATAw32-Lw31*Uw12)/Uw22

Uw33=ATAw33-Lw31*Uw13-Lw32*Uw23
```

The three equations
```
        | 1    0    0|   |Yw1|   ATBw1
        |Lw21  1    0| * |Yw2| = ATBw2
        |Lw31 Lw32  1|   |Yw3|   ATBw3
```
are now solved for Yw* by forward substitution using:
```
        Yw1 = ATBw1
        Yw2 = ATBw2-Lw21*Yw1
        Yw3 = ATBw3-Lw31*Yw1-Lw32*Yw2
```

Then the three equations
```
        |Uw11 Uw12 Uw13|   |Xw1|   |Yw1|
        | 0   Uw22 Uw23| * |Xw2| = |Yw2|
        | 0    0   Uw33|   |Xw3|   |Yw3|
```
are solved for Xw* by backward substitution using:
```
        Xw3=Yw3/Uw33
        Xw2=(Yw2-Uw23*Xw3)/Uw22
        Xw1=(Yw1-Uw13*Xw3-Uw12*Xw2)/Uw11
```

The values Xw* are the optimum (MMSE) estimates of angular misalignment of the IMU with respect to the INS based on rate measurements:
```
        DYW= Xw1 = yaw misalignment in radians
        DPW= Xw2 = pitch misalignment in radians
        DRW= Xw3 = roll misalignment in radians
```

Aw, Bw, ATAw, ATBw, Lw, Uw, Yw*, and Xw* are continuously recomputed at 0.5 second intervals producing new values of DYW, DPW, and DRW each time.

IIIf. Combination of Acceleration and Rate Misalignment Results

The following iterative calculations combine and filter the misalignment calculations produced in IIId and IIIe. They are performed at 0.5 second intervals. Their form is identical for yaw, pitch, and roll with the exception that no accelerometer estimate of yaw misalignment exists.

Yaw misalignment
```
      X4D=G1*(DYW-DY)
      IF(X4D.GE.X4DLIM)THEN
       X4D=X4DLIM
      ELSE IF(X4D.LE.(-X4DLIM))THEN
       X4D=-X4DLIM
      ELSE
       X4D=X4D
      END IF

IF(WOW.EQ.TRUE)THEN
       X4=0.0
      ELSE
       X4=X4+0.5*X4D
      END IF

DYD=G2*(X4+0.0-DY)
      IF(DYD.GE.DYDLIM)THEN
       DYD=DYDLIM
      ELSE IF(DYD.LE.(-DYDLIM))THEN
       DYD=-DYDLIM
```

```
        ELSE
          DYD=DYD
        END IF

DY=DY+0.5*DYD
        IF(DY.GE.DYLIM)THEN
          DY=DYLIM
        ELSE IF(DY.LE.(-DYLIM))THEN
          DY=-DYLIM
        ELSE
          DY=DY
        END IF
where
        DY = the yaw misalignment in radians (initial value = 0.0)
        DYW = the yaw misalignment estimate
        X4 = intermediate filter variable (initial value = 0.0)
        G1 = 0.01 = outer loop filter bandwidth in rad/sec
        G2 = 0.025 = inner loop filter bandwidth in rad/sec
        X4DLIM = 0.0002 = outer loop filter rate limit in rad/sec
        DYDLIM = 0.0004 = inner loop filter rate limit in rad/sec
        DYLIM = 0.04 = filter output position limit in radians
        WOW = weight-on-wheels discrete Pitch misalignment
        X5D=G3*(DPW-DP)
        IF(X5D.GE.X5DLIM)THEN
          X5D=X5DLIM
        ELSE IF(X5D.LE.(-X5DLIM))THEN
          X5D=-X5DLIM
        ELSE
          X5D=X5D
        END IF IF(WOW.EQ.TRUE)THEN
          X5=0.0
        ELSE
          X5=X5+0.5*X5D
        END IF DPD=G4*(X5+DPA-DP)
        IF(DPD.GE.DPDLIM)THEN
          DPD=DPDLIM
        ELSE IF(DPD.LE.(-DPDLIM))THEN
          DPD=-DPDLIM
        ELSE
          DPD=DPD
        END IF DP=DP+0.5*DPD
        IF(DP.GE.DPLIM)THEN
          DP=DPLIM
        ELSE IF(DP.LE.(-DPLIM))THEN
          DP=-DPLIM
        ELSE
          DP=DP
        END IF
where
        DP = the pitch misalignment in radians (initial value = 0.0)
        DPW = the pitch misalignment estimate from rates
        DPA = the pitch misalignment estimate from accelerations
        X5 = intermediate filter variable (initial value = 0.0)
        G3 = 0.01 = outer loop filter bandwidth in rad/sec
        G4 = 0.10 = inner loop filter bandwidth in rad/sec
        X5DLIM = 0.0002 = outer loop filter rate limit in rad/sec
        DPDLIM = 0.002 = inner loop filter rate limit in rad/sec
        DPLIM = 0.04 = filter output position limit in radians
        WOW = weight-on-wheels discrete
```

Roll misalignment
```
      X6D=G5*(DRW-DR)
      IF(X6D.GE.X6DLIM)THEN
        X6D=X6DLIM
      ELSE IF(X6D.LE.(-X6DLIM))THEN
        X6D=-X6DLIM
      ELSE
        X6D=X6D
      END IF

IF(WOW.EQ.TRUE)THEN
        X6=0.0
      ELSE
        X6=X6+0.5*X6D
      END IF

DRD=G6*(X6+DRA-DR)
      IF(DRD.GE.DRDLIM)THEN
        DRD=DRDLIM
      ELSE IF(DRD.LE.(-DRDLIM))THEN
        DRD=-DRDLIM
      ELSE
        DRD=DRD
      END IF

DR=DR+0.5*DRD
      IF(DR.GE.DRLIM)THEN
        DR=DRLIM
      ELSE IF(DR.LE.(-DRLIM))THEN
        DR=-DRLIM
      ELSE
        DR=DR
      END IF
```
where
- DR = the roll misalignment in radians (initial value = 0.0)
- DRW = the roll misalignment estimate from rates
- DRA = the roll misalignment estimate from accelerations
- X6 = intermediate filter variable (initial value = 0.0)
- G5 = 0.01 = outer loop filter bandwidth in rad/sec
- G6 = 0.10 = inner loop filter bandwidth in rad/sec
- X6DLIM = 0.0002 = outer loop filter rate limit in rad/sec
- DRDLIM = 0.002 = inner loop filter rate limit in rad/sec
- DRLIM = 0.04 = filter output position limit in radians
- WOW = weight-on-wheels discrete

IIIg. Computation of Misalignment Output Transformation

The misalignments computed in IIIf are combined with the prealignment transformation of IIIb to produce an overall misalignment transformation to be passed to the IMU strapdown computations. This transformation is computed at 0.5 second intervals. It is calculated by $$Mg = \begin{vmatrix} M11 & M21 & M31 \\ M12 & M22 & M32 \\ M13 & M23 & M33 \end{vmatrix} * \begin{vmatrix} 1 & DY & -DP \\ -DY & 1 & DR \\ DP & -DR & 1 \end{vmatrix}$$

where
- M** = the constant values of IIIb (notice the row & column interchange relative to the M matrix of IIIb)
- DY,DP,DR = the misalignments computed in IIIf.

IV. IMU Strapdown Attitude Calculations

Quaternion computations based on IMU rates, IMU/INS misalignment computations, and INS vehicle roll, pitch, and yaw are described below.

IVa. Conversion of IMU Angular Increments and Alignment Errors to Their Quaternion Equivalents The IMU angular increments are converted to their quaternion equivalents by the following operations performed at the nominally 100 hz computation rate:

BA1G=0.5*(B4G*IAX-B3G*IAY+B2G*IAZ)
    BA2G=0.5*(B3G*IAX+B4G*IAY-B1G*IAZ)
    BA3G=0.5*(-B2G*IAX+B1G*IAY+B4G*IAZ)
    BA4G=0.5*(-B1G*IAX-B2G*IAY-B3G*IAZ)

where
    BA*G = the IMU quaternion increments
    IA*  = the IMU angular increments from I.
    B*G  = the previously computed values of the IMU quaternions
           from IVc Similarly, the previously-computed IMU attitude errors are converted to their quaternion equivalents by BE1G=0.5*(B4G*RGE-B3G*PGE+B2G*YGE)
    BE2G=0.5*(B3G*RGE+B4G*PGE-B1G*YGE)
    BE3G=0.5*(-B2G*RGE+B1G*PGE+B4G*YGE)
    BE4G=0.5*(-B1G*RGE-B2G*PGE-B3G*YGE)

where
    BE*G = the IMU quaternion errors
    YGE,PGE,RGE = the yaw, pitch, roll attitude alignment errors of
                  the IMU in radians (previously computed from IVe)
    B*G  = the previously computed values of the IMU quaternions
           from IVc

IVb. IMU Attitude Alignment Correction Algorithm

The IMU attitude errors are operated on by the following algorithm which is iterated at the nominal 100 hertz rate. It produces correction rates for the quaternion integrators to maintain attitude alignment.

integral portion
     BI1G = BI1G + (WCAG*WCAG/3.0)*dT*BE1G
     BI2G = BI2G + (WCAG*WCAG/3.0)*dT*BE2G
     BI3G = BI3G + (WCAG*WCAG/3.0)*dT*BE3G
     BI4G = BI4G + (WCAG*WCAG/3.0)*dT*BE4G proportional+integral total
     BC1G = BI1G + WCAG*BE1G
     BC2G = BI2G + WCAG*BE2G
     BC3G = BI3G + WCAG*BE3G
     BC4G = BI4G + WCAG*BE4G where
    BC*G = the total alignment correction rates
    BI*G = the integral portion of the alignment correction rates
           (initial value = 0.0)
    BE*G = the quaternion alignment errors
    WCAG = 0.5 = the IMU alignment algorithm bandwidth in rad/sec
    dT   = 0.01 = calculation time interval in sec (previously defined)

IVc. Computation of the IMU Quaternions

The IMU quaternion increments and rate corrections are accummulated/integrated to produce updated quaternion values by:

B1G = B1G + BA1G + dT*BC1G
     IF(B1G.GE.1.0)THEN
       B1G =1.0
     ELSE IF(B1G.LE.(-1.0))THEN
       B1G =-1.0
     ELSE
       B1G=B1G
     END IF

```
     B2G = B2G + BA2G + dT*BC2G
      IF(B2G.GE.1.0)THEN
        B2G =1.0
      ELSE IF(B2G.LE.(-1.0))THEN
        B2G =-1.0
      ELSE
        B2G=B2G
      END IF

B3G = B3G + BA3G + dT*BC3G
      IF(B3G.GE.1.0)THEN
        B3G =1.0
      ELSE IF(B3G.LE.(-1.0))THEN
        B3G =-1.0
      ELSE
        B3G=B3G
      END IF

B4G = B4G + BA4G + dT*BC4G
      IF(B4G.GE.1.0)THEN
        B4G =1.0
      ELSE IF(B4G.LE.(-1.0))THEN
        B4G =-1.0
      ELSE
        B4G=B4G
      END IF
``` where
  B*G = the IMU attitude quaternions
       ( initial values  B1G=B2G=B3G=0.0, B4G=1.0)
  BA*G = the IMU quaternion increments
  BC*G = the alignment correction rates
  dT = 0.01 = current calculation time interval in sec
              (previously defined)

IVd. Computation of the IMU Attitude Transformation Matrix and Its Inverse

The IMU attitude transformation matrix $$TG = \begin{vmatrix} TG11 & TG12 & TG13 \\ TG21 & TG22 & TG23 \\ TG31 & TG32 & TG33 \end{vmatrix}$$

and its inverse $$TG^{-1} = \begin{vmatrix} TG11 & TG21 & TG31 \\ TG12 & TG22 & TG32 \\ TG13 & TG23 & TG33 \end{vmatrix}$$

are computed at the nominal 100 hz rate by

```
         TG11 = B4G*B4G+B1G*B1G-B2G*B2G-B3G*B3G
         TG12 = 2*(B1G*B2G+B4G*B3G)
         TG13 = 2*(B1G*B3G-B4G*B2G)
         TG21 = 2*(B1G*B2G-B4G*B3G)
         TG22 = B4G*B4G-B1G*B1G+B2G*B2G-B3G*B3G
         TG23 = 2*(B2G*B3G+B4G*B1G)
         TG31 = 2*(B1G*B3G+B4G*B2G)
         TG32 = 2*(B2G*B3G-B4G*B1G)
         TG33 = B4G*B4G-B1G*B1G-B2G*B2G+B3G*B3G
```
where
    B*G = the IMU quaternions IVe. Computation of IMU Attitude Alignment Errors The IMU attitude alignment errors are computed at 100hz by rotating two body-referenced vectors through the inverse INS transformations, through the forward IMU transformation, and then through the inverse of the IMU/INS misalignment transformation:

$$\begin{vmatrix} PGE & * \\ -RGE & YGE \\ * & * \end{vmatrix} = |Mg| * TG * \begin{vmatrix} cY & -sY & 0 \\ sY & cY & 0 \\ 0 & 0 & 1 \end{vmatrix}^{-1} * \begin{vmatrix} cP & 0 & sP \\ 0 & 1 & 0 \\ -sP & 0 & cP \end{vmatrix} * \begin{vmatrix} 1 & 0 & 0 \\ 0 & cR & -sR \\ 0 & sR & 1 \end{vmatrix} * \begin{vmatrix} 0 & 1 \\ 0 & 0 \\ 1 & 0 \end{vmatrix}$$

where
- YGE, PGE, RGE = the yaw, pitch, roll attitude alignment errors of the IMU in radians
- sP, cP, sR, cR, sY, cY = sines & cosines of vehicle yaw, pitch, roll from the INS
- Mg = the IMU/INS misalignment output transformation
- TG = the 3x3 IMU attitude transformation matrix from IVd

We claim:

1. A method for accurately determining the attitude of a location in a vehicle that flexes with respect to the said location of a first attitude sensor mounted within the vehicle and having an output by means of a second attitude sensor that is mounted at said flexing location and having attitude output accompanied by a greater error than said output of said first attitude sensor, comprising the steps of:
   a. periodically determining the flexure angle between said first and second attitude sensors by comparing said attitude outputs of each, and
   b. generating attitude information for said flexing location based on said second sensor output and also based on a master input formed by the sum of said first sensor output and said flexure angle, thus slaving said output of said second attitude sensor to said master input to reduce the error associated with said output of said second sensor.

2. A method for accurately determining an attitude as defined in claim 1, wherein both sensors include gyro means, the drift error of the gyro means of the second sensor being greater than the drift error of the gyro means of the first sensor, and wherein said slaving reduces the drift error associated with second sensor.

3. A method for accurately determining an attitude as defined in claim 2, wherein the yaw component flexure angle is determined by the combined output of only the gyro means in both of said attitude sensors.

4. A method for accurately determining an attitude as defined in claim 3, further including the step of filtering the outputs of the gyro means of both the first and second attitude sensors to remove information associated with linear and angular vibrations before combining said outputs to determine said yaw component flexure angle.

5. A method for accurately determining an attitude as defined in claim 1, wherein said slaving occurs at a frequency substantially lower than the frequency at which attitude information is accumulated from the gyro means so that said slaving does not prevent the gyro means of the second sensor from following dynamic attitude fluctuations.

6. A method for accurately determining an attitude as defined in claim 1, wherein said flexure angle includes pitch, yaw and roll component angles, and both of said attitude sensors include accelerometer means and gyro means, and said component flexure angles are determined by the combined output of the accelerometer and gyro means of said sensors to minimize error.

7. A method for accurately determining an attitude as defined in claim 6, wherein said pitch and roll component flexure angles are determined by the combined output of the accelerometer and gyro means of both the first and second attitude sensors in order to reduce offset errors associated with the output of the accelerometer means.

8. A method for accurately determining an attitude as defined in claim 7, further including the step of filtering the outputs of the accelerometer means and gyro means of both the first and second attitude sensors to remove information associated with linear and angular vibrations before combining said outputs to determine said pitch and roll component flexure angles.

9. A method for accurately determining an attitude as defined in claim 6, wherein the pitch, yaw and roll component flexure angles are determined by periodically generating minimum mean square error estimates of each of said component angles.

10. A method for accurately determining an attitude as defined in claim 9, wherein said minimum means square error estimates are generated by both sampling the outputs of both of said attitude sensors at intervals of between about 0.25 and 0.75 seconds, and by computing said angles at intervals of between about 0.25 and 0.75 seconds.

11. The method of claim 1 wherein said flexing location attitude information is generated by an integral feedback control system having said master input as a primary input, said second sensor output as a secondary input, and having said generated attitude information fed back in a loop to be combined with said master input.

12. The method of claim 11 wherein the feedback control system continually adjusts the flexing location attitude information so that differences between the flexing location attitude information and a corresponding representation of the master input converge to zero.

13. A method for accurately determining the attitude of a flexing location in a vehicle that flexes with respect to the location of an inertial navigation sensor mounted within the vehicle by means of an attitude sensor that is mounted at said flexing location, wherein both sensors include gyro means and accelerometer means for producing an attitude output, and wherein the attitude output of the gyro means of the attitude sensor is accompanied by a larger drift error than the output of the gyro means of the inertial navigation system comprising the steps of:
   a. determining the pitch, yaw and roll components of the flexure angle between the sensors by comparing said attitude outputs of each sensor;
   b. continuously calculating said flexing location attitude as a function of a master input formed by the sum of said inertial navigation system output and said flexure angle computed in step (a), with said gyro means output of said attitude sensor forming a secondary input in said calculation thus slaving said attitude sensor output to said master input to reduce the drift error associated with the gyro means of said attitude sensor.

14. A method for accurately determining the attitude of a location as defined in claim 13, wherein said slaving is performed at a frequency substantially lower than the frequency at which attitude information is accumulated from the gyro means of the attitude sensor to allow the slaved attitude output of the attitude sensor to follow dynamic attitude fluctuations caused by vehicle flexure.

15. A method for accurately determining the attitude of a location as defined in claim 13, wherein said pitch and roll component flexure angles are determined by the combined output of the accelerometer and gyro means of both said sensors in order to reduce offset errors associated with the output of the accelerometer means.

16. A method for accurately determining the attitude of a location as defined in claim 15, further including the step of filtering the outputs of the accelerometer means and gyro means of both the first and second attitude sensors to remove information associated with linear and angular vibrations before combining said outputs to determine said pitch and roll component flexure angles.

17. A method for accurately determining the attitude of a location as defined in claim 15, further including the step of correcting for moment arm variations between the accelerator means of said sensors before combining the outputs of said accelerometers with said gyro means to determine said pitch and roll component flexure angles.

18. A method for accurately determining the attitude of a location as defined in claim 13, wherein the yaw component flexure angle is determined by the combined output of only the gyro means in both of said attitude sensors.

19. A method for accurately determining the attitude of a location as defined in claim 18, further including the step of filtering the outputs of the gyro means of both the first and second attitude sensors to remove information associated with linear and angular vibrations before combining said outputs to determine said yaw component flexure angle.

20. A method for accurately determining the attitude of a location as defined in claim 13, wherein the pitch, yaw and roll component flexure angles are determined by periodically generating minimum means square error estimates of each of said component angles.

21. A method for accurately determining the attitude of a location as defined in claim 20, wherein said minimum means square error estimates are generated both by sampling the outputs of both of said attitude sensors at intervals of between about 0.25 and 0.75 seconds, and by computing said angles at intervals of between about 0.25 and 0.75 seconds.

22. A method for accurately determining the attitude of a location as defined in claim 21, further including the step of filtering noise from the minimum mean square error estimates before combining these estimates to obtain the components of said flexure angle.

23. The method of claim 13 wherein said flexing location attitude information is generated by an integral feedback control system having said master input as a primary input, said secondary input as a secondary input, and having said generated attitude information fed back in a loop to be combined with said master input.

24. The method of claim 23 wherein the feedback control system continually adjusts the flexing location attitude information so that differences between the flexing location attitude information and a corresponding representation of the master input converge to zero.

25. A system for accurately determining the attitude of a flexing location in a vehicle that flexes with respect to the location of an inertial navigation sensor having an attitude output and mounted within said vehicle, comprising:

attitude sensor means including an attitude sensor mounted at said flexing location and having an attitude output, for determining the flexure angle between said inertial navigation sensor and said flexing location by comparing said attitude outputs of each, and attitude determining means for determining the attitude of said flexing location based on said flexure angle and on said attitude outputs.

26. A system for accurately determining the attitude as defined in claim 25, wherein said attitude determining means slaves the attitude output of said attitude sensor to the attitude output of said inertial navigation unit at low frequency to allow the output of said attitude sensor to follow dynamic attitude fluctuations.

27. A system for accurately determining the attitude as defined in claim 25, wherein said flexure angle includes pitch, yaw and roll component angles, and both said sensors include accelerometer means and gyro means, and wherein said means for determining the flexure angle between the inertial navigation sensor and the location of the attitude sensor determines the pitch and roll component angles by combining the output of the accelerometer and gyro means of the inertial navigation sensor and the attitude sensor in order to reduce offset errors associated with the output of said accelerometer means.

28. A system for accurately determining the attitude as defined in claim 27, wherein said means for determining said flexure angle determines the yaw component angle by combining the output of only the gyro means of the inertial navigation sensor and the attitude sensor.

29. A system for accurately determining the attitude as defined in claim 28, wherein said means for determining the flexure angle filters the outputs of both the inertial navigation sensor and the attitude sensor to remove information associated with linear and angular vibrations before combining said outputs to determine said pitch, yaw and roll component angles.

30. The system of claim 25 wherein the error associated with the attitude output of said attitude sensor is greater than the error associated with the attitude output of said inertial navigation sensor.

31. The system of claim 25 wherein the attitude determining means determines the attitude of said flexing location based on said attitude sensor output and also based on a master input formed by the sum of said inertial navigation sensor output and said flexure angle, thus slaving said output of said second attitude sensor to said master input to reduce the error associated with said output of said attitude sensor.

32. The system of claim 31 wherein said flexing location attitude information is generated by an integral feedback control system having said master input as a primary input, said attitude sensor output as a secondary input, and having said generated attitude information fed back in a loop to be combined with said master input.

33. The system of claim 32 wherein the feedback control system continually adjusts the flexing location attitude information so that differences between the flexing location attitude information and a corresponding representation of the master input converge to zero.

* * * * *